US011463138B2

(12) United States Patent
Pezeshki et al.

(10) Patent No.: US 11,463,138 B2
(45) Date of Patent: Oct. 4, 2022

(54) NEURAL NETWORK AND ANTENNA CONFIGURATION INDICATION

(71) Applicant: QUALCOMM INCORPORATED, San Diego, CA (US)

(72) Inventors: Hamed Pezeshki, San Diego, CA (US); Tao Luo, San Diego, CA (US); Taesang Yoo, San Diego, CA (US); Mahmoud Taherzadeh Boroujeni, San Diego, CA (US); Arumugam Chendamarai Kannan, San Diego, CA (US); Jingchao Bao, San Diego, CA (US); Sony Akkarakaran, Poway, CA (US); Ajay Gupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/247,664

(22) Filed: Dec. 18, 2020

(65) Prior Publication Data

US 2021/0194548 A1 Jun. 24, 2021

Related U.S. Application Data

(60) Provisional application No. 62/951,889, filed on Dec. 20, 2019.

(51) Int. Cl.

| | |
|---|---|
| ***H04L 23/02*** | (2006.01) |
| ***H04B 7/0456*** | (2017.01) |
| ***G06N 3/08*** | (2006.01) |

(52) U.S. Cl.

CPC ............ *H04B 7/0473* (2013.01); *G06N 3/08* (2013.01); *H04B 7/0478* (2013.01); *H04B 7/0482* (2013.01)

(58) Field of Classification Search

CPC ................ H04L 41/16; H04L 25/0202; H04L 25/03165; H04W 4/06; H04W 16/14; H04W 88/06; H04W 8/245

(Continued)

(56) References Cited

U.S. PATENT DOCUMENTS

| | | | |
|---|---|---|---|
| 2018/0367192 A1 | 12/2018 | O'Shea et al. | |
| 2020/0412417 A1* | 12/2020 | Calzolari ............ | H04B 7/0608 |

(Continued)

FOREIGN PATENT DOCUMENTS

| | | |
|---|---|---|
| CN | 110535500 A | 12/2019 |
| WO | 2019118676 A1 | 6/2019 |

OTHER PUBLICATIONS

International Search Report and Written Opinion—PCT/US2020/066259—ISA/EPO—dated Mar. 15, 2021.

*Primary Examiner* — Khai Tran

(74) *Attorney, Agent, or Firm* — Haynes and Boone, LLP

(57) ABSTRACT

Wireless communications systems and methods related to indicating antenna configuration information and neural network information are disclosed. Neural network information may be selected for an encoder side based on an antenna configuration of a first device housing the encoder. This information may be transmitted with the antenna configuration information to a second device, which may jointly train the neural network with the first device. The first device may further transmit one or more weights after the training, which are stored with the antenna configuration information at the second device as well. When a third device with similar antenna configuration as the first device establishes communication with the second device, the second device may transmit neural network information, as well as weights, to the third device. The third device may use this (Continued)

information, instead of default information, to speed up neural network initialization and training.

30 Claims, 8 Drawing Sheets

(58) Field of Classification Search
USPC .......................................................... 375/262
See application file for complete search history.

(56) References Cited

U.S. PATENT DOCUMENTS

| | | | | |
|---|---|---|---|---|
| 2021/0110261 | A1* | 4/2021 | Lee | H04L 25/0254 |
| 2021/0182658 | A1* | 6/2021 | Wang | G06N 3/0454 |
| 2021/0342687 | A1* | 11/2021 | Wang | G06N 3/0445 |

* cited by examiner

NEURAL NETWORK AND ANTENNA CONFIGURATION INDICATION

CROSS REFERENCE TO RELATED APPLICATIONS

The present application claims priority to and the benefit of the U.S. Provisional Patent Application No. 62/951,889, filed Dec. 20, 2019, which is hereby incorporated by reference in its entirety as if fully set forth below in its entirety and for all applicable purposes.

TECHNICAL FIELD

This application relates to wireless communication systems, and more particularly to indicating antenna configuration information and neural network information between devices.

INTRODUCTION

To meet the growing demands for expanded mobile broadband connectivity, wireless communication technologies are advancing from the long term evolution (LTE) technology to a next generation new radio (NR) technology, which may be referred to as $5^{th}$ Generation (5G). In a wireless communication network implementing such wireless communication technologies, wireless multiple-access communications system may include a number of base stations (BSs), each simultaneously supporting communications for multiple communication devices, which may be otherwise known as user equipment (UE).

As wireless communications technologies continue to advance, neural networks have been used in an effort to address some problems that arise with respect to complexity, performance, and other factors. Training neural networks can be a time-intensive and compute-intensive process, however. This may introduce inefficiencies and power drain, among other problems, as devices undergo the processing necessary to train and otherwise implement neural networks for transmitting and receiving data. Thus, there is a need to provide more efficient ways in which to facilitate neural network training and use in wireless communication systems.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes establishing, by a first wireless communications device, communication with a second wireless communications device. The method further includes determining, by the first wireless communications device, a neural network to use for the communication with the second wireless communications device based on an antenna configuration of the first wireless communications device. The method further includes transmitting, by the first wireless communications device, antenna configuration information and at least one neural network parameter based on the neural network to the second wireless communications device.

In an additional aspect of the disclosure, a method of wireless communication includes establishing, by a first wireless communications device, communication with a second wireless communications device. The method further includes receiving, by the first wireless communications device from the second wireless communications device, antenna configuration information of an antenna configuration at the second wireless communications device and at least one neural network parameter of a neural network at the second wireless communications device for the communication. The method further includes storing, by the first wireless communications device, the antenna configuration information and the at least one neural network parameter.

In an additional aspect of the disclosure, a first wireless communications device includes a transceiver configured to establish communication with a second wireless communications device. The first wireless communications device further includes a processor configured to determine a neural network to use for the communication with the second wireless communications device based on an antenna configuration of the first wireless communications device. The first wireless communications device further includes wherein the transceiver is further configured to transmit antenna configuration information and at least one neural network parameter based on the neural network to the second wireless communications device.

In an additional aspect of the disclosure, a first wireless communications device includes a transceiver configured to establish communication with a second wireless communications device. The transceiver is further configured to receive, from the second wireless communications device, antenna configuration information of an antenna configuration at the second wireless communications device and at least one neural network parameter of a neural network at the second wireless communications device for the communication. The first wireless communications device further includes a processor configured to store the antenna configuration information and the at least one neural network parameter at the first wireless communications device.

In an additional aspect of the disclosure, a non-transitory computer-readable medium having program code recorded thereon, the program code comprising code for causing a first wireless communications device to establish communication with a second wireless communications device. The program code further comprises code for causing the first wireless communications device to determine a neural network to use for the communication with the second wireless communications device based on an antenna configuration of the first wireless communications device. The program code further comprises code for causing the first wireless communications device to transmit antenna configuration information and at least one neural network parameter based on the neural network to the second wireless communications device.

In an additional aspect of the disclosure, a non-transitory computer-readable medium having program code recorded thereon, the program code comprising code for causing a first wireless communications device to establish communication with a second wireless communications device. The program code further comprises code for causing the first wireless communications device to receive, from the second wireless communications device, antenna configuration information of an antenna configuration at the second wireless communications device and at least one neural network parameter of a neural network at the second wireless communications device for the communication. The program code further comprises code for causing the first wireless communications device to store the antenna configuration information and the at least one neural network parameter.

In an additional aspect of the disclosure, a first wireless communications device includes means for establishing communication with a second wireless communications device. The first wireless communications device further includes means for determining a neural network to use for the communication with the second wireless communications device based on an antenna configuration of the first wireless communications device. The first wireless communications device further includes means for transmitting antenna configuration information and at least one neural network parameter based on the neural network to the second wireless communications device.

In an additional aspect of the disclosure, a first wireless communications device includes means for establishing communication with a second wireless communications device. The first wireless communications device further includes means for receiving, from the second wireless communications device, antenna configuration information of an antenna configuration at the second wireless communications device and at least one neural network parameter of a neural network at the second wireless communications device for the communication. The first wireless communications device further includes means for storing the antenna configuration information and the at least one neural network parameter.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
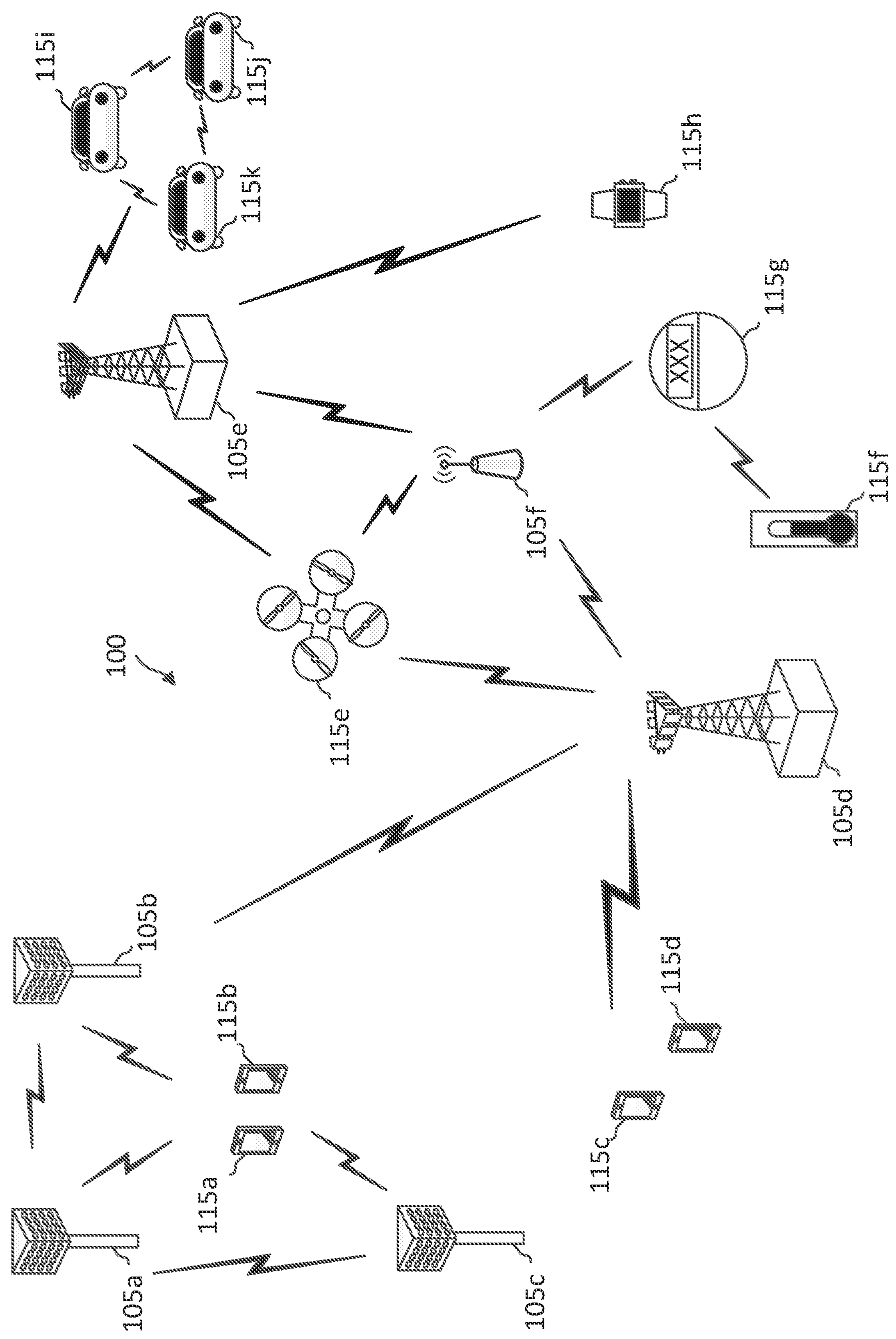
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/$km^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for indicating antenna configuration information and neural network information between devices. According to embodiments of the present disclosure two wireless communications devices may use a machine learning/neural network framework in order to encode for transmission across a channel and decode upon receipt. For example, the two wireless devices may jointly train an autoencoder. The autoencoder may be split between the transmitting and receiving sides—i.e., the encoder and decoder of the autoencoder may be implemented in different devices. Embodiments of the present disclosure facilitate speeding up the training process when subsequent devices communicate with a device that has already obtained one or more neural network parameters from a device with a matching or similar antenna configuration.

For example, a first wireless communications device may establish communication with a second wireless communications device. In an example, the first wireless communications device may be a user equipment (UE) and the second wireless communications device may be a base station (BS, also referred to as evolved node Bs or next generation eNBs for example); alternatively, the first wireless communications device may be a BS and the second wireless communications device a UE, or both devices may be UEs. For sake of discussion, the first wireless communications device is presumed to be the transmitter of information, and thus has the encoder side resident, and the second wireless communications device is the receiver, and thus has the decoder side resident—though as noted above either device may at different times and/or contexts be a transmitter or receiver.

Once communication is established, the first wireless communications device may determine a neural network to use for transmission of some or all types of data to the second wireless communications device. In some embodiments, the first wireless communications device may be pre-provisioned with multiple different neural network configuration options (also referred to herein as artificial intelligence (AI) modules) including different numbers of layers, numbers of nodes in layers, algorithms used. Determining the neural network may include selecting one of the pre-provisioned options based on one or more antenna configuration parameters of the first wireless communications device. In some other embodiments, the first wireless communications device may not have pre-provisioned options but instead may determine the number of layers, number of nodes per layer, algorithms used in each layer, etc. for use in encoding, and based on the one or more antenna configuration parameters of the first wireless communications device.

According to embodiments of the present disclosure, the first wireless communications device may transmit the neural network information together with the antenna configuration information to the second wireless communications device. After the two devices engage in jointly training the neural network to achieve a sufficiently similar output at the receiving end as the training input at the transmitting end. Upon completion of training, compression of input data will result in a codeword of reduced dimensionality that improves transmission efficiency and reduces resource utilization, which is recoverable at the decoder side. According to some further embodiments of the present disclosure, the first wireless communications device may transmit (e.g., in encoded form to reduce resource consumption in the channel) the training weights from the trained neural network to the second wireless communications device, which may store the information in association with the antenna configuration information of the first wireless communications device as well. The second wireless communications device may be able to search its records based on antenna configuration to identify neural network information and weights.

Subsequently, when the second wireless communications device establishes communication with a third wireless communications device (e.g., a UE entering a new cell of a new BS, or a new UE entering a cell of a BS), the second wireless communications device may check whether the antenna configuration of the third wireless communications device matches (or passes a similarity threshold) any other antenna configuration information stored at the second wireless communications device. As an example for purposes of discussion, sufficient similarity (up to and including matching) may be found between the antenna configuration of the third wireless communications device and the stored antenna configuration information of the first wireless communications device that had previously transmitted its antenna configuration information with neural network indication to the second wireless communications device.

In response, the second wireless communications device may transmit the neural network information received from the first wireless communications device to the third wireless communications device to aid in neural network selection and/or training at the third wireless communications device. In addition, if the first wireless communications device transmitted neural network weights, the second wireless communications device may transmit that as well to the third wireless communications device. The third wireless communications device may implement this information to speed up the selection and/or training of the neural network used between the third wireless communications device and the second wireless communications device. This may conserve system resources by not requiring the new device to identify and train the new system (e.g., between the second wireless communications device and the third wireless communications device) from default parameters.

Aspects of the present disclosure can provide several benefits. For example, as already noted training neural networks may be a time-intensive and compute-intensive process, consuming a large amount of system resources. If a deep neural network has already been used and trained for a certain antenna configuration pair, the same neural network may be leveraged for future communication purposes between the second wireless communications device and other wireless communications devices. As a result, system resources may be conserved by not identifying and training the new system (e.g., between the second and third wireless communications devices in this example) from scratch.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ a listen-before-talk (LBT) procedure to monitor for transmission opportunities (TXOPs) in the shared channel. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel A TXOP may also be referred to as channel occupancy time (COT).

In some aspects, the network 100 may provision for sidelink communications to allow a UE 115 to communicate with another UE 115 without tunneling through a BS 105 and/or the core network. The BS 105 may configure certain resources in a licensed band and/or an unlicensed band for sidelink communications between the UE 115 and the other UE 115. A UE 115 may transmit, during sidelink communications, physical sidelink shared channel (PSSCH) data, physical sidelink shared control channel (PSCCH) sidelink control information (SCI), sidelink COT sharing SCI, sidelink scheduling SCI, and/or physical sidelink feedback channel (PSFCH) ACK/NACK feedbacks (e.g., HARQ for sidelink) to another UE and/or receive PSSCH data, PSCCH SCI, sidelink COT sharing SCI, sidelink scheduling SCI, and/or PSFCH ACK/NACK feedbacks from another UE 115.

A UE 115, whether communicating to a BS 105 or another UE 115, may implement artificial intelligence (AI), such as machine learning (ML) and/or deep learning (DL), to assist with communications to achieve one or more benefits, including for example requiring no knowledge of an underlying data distribution, or explicit identification of a certain structure in order to work, as well as higher compression efficiency, etc. One example of such an implementation is an autoencoder, split between the transmitting and receiving sides—i.e., the encoder and decoder of the autoencoder may be implemented in different devices. In the example where a UE 115 is communicating with a BS 105, the encoder may be at the UE 115 and the BS 105 may have the decoder, which cooperate together as an autoencoder in order to train and implement end-to-end compression and reconstruction of data. In another example, the BS 105 may be replaced by another UE 115, or the BS 105 may be the source of a transmission to another device, and therefore have the encoder, etc. More generally, a first wireless communications device transmitting to another device may serve as an encoder and a second wireless communications device receiving from the first device may serve as a decoder in an autoencoder implementation. Data that is transmitted after compression by the encoder may be referred to herein as encoded data, compressed data, a code, and so forth.

Because training the neural network used in the autoencoder (between a first wireless communications device and a second wireless communications device) may consume a significant amount of resources including compute resources and/or time resources as just a few examples, it is desirable to mitigate the consumption. For example, when a first wireless communications device establishes communication (e.g., according to one or more of the procedures discussed above with respect to FIG. 1), it may transmit information about the neural network the first wireless communications device will train for subsequent use in communication with the second wireless communications device. The first wireless communications device may transmit the neural network information together with antenna configuration information of the first wireless communications device to the second wireless communications device.

In some embodiments, the first wireless communications device may be provisioned (e.g., previously, such as statically or dynamically, for example via RRC signaling, MAC signaling, or other signaling) with a set of potential neural network configurations, also referred to herein as AI modules for simplicity, from which to select. For example, a given AI module may specify different neural network characteristics, including for example a number of layers to use in the neural network on the encoder side, a number of nodes to use in each layer at the encoder side, etc. In other embodiments, the first wireless communications device may not be provisioned with potential neural network configurations; instead, the first wireless communications device may select a number of layers, a number of nodes per layer, etc., dynamically for use in encoding. Under any of the above approaches, the first wireless communications device may select the neural network based on an antenna configuration of the first wireless communications device.

By sending the neural network information to the second wireless communications device, the first and second wireless communications devices may engage in training the neural network for subsequent use. This may be a collaborative and iterative process to achieve the same output as the input training sequence(s). For example, the first wireless communications device may modify one or more training weights and/or biases for one or more nodes in one or more layers of the neural network at the first wireless communications device.

According to some embodiments of the present disclosure, when the first wireless communications device completes training in cooperation with the second wireless communications device, the first wireless communications device may transmit an identification of one or more of the weights, and/or one or more of biases, for corresponding nodes resulting from the training to the second wireless communications device. This may be transmitted without compression, or alternatively may be done after compression by the neural network after training. This information may be kept in association with the antenna configuration information for the first wireless communications device as well. The second wireless communications device may be able to search its records based on antenna configuration to identify neural network information and weights (or biases).

For example, should the second wireless communications device establish communication with a third wireless communications device (e.g., a BS 105 establishing communication with another UE 115, or a UE 115 establishing communication with another BS 105 due to a change in location, etc.), the second wireless communications device may use the neural network configuration information and/or training biases in order to reduce computational and/or time burdens on the third wireless communications device. To do so, the second wireless communications device may first determine whether antenna configuration information from the third wireless communications device corresponds to antenna configuration information from another device that trained a neural network in cooperation with the second wireless communications device previously. This may include, for example, determining whether the antenna configuration of the third wireless communications device is the same as the antenna configuration of the first wireless communications device, or passes a similarity threshold, etc.

The second wireless communications device may send the neural network configuration information (e.g., information that identifies a number of layers, a number of nodes, etc.) to the third wireless communications device when the antenna configurations are sufficiently similar. For example, if the second wireless communications device is a BS 105, this may be an instruction to use the same neural network information; if the second wireless communications device is a UE 115, and the third wireless communications device is a BS 105, this may be a recommendation. Together with this neural network information, the second wireless communications device may also transmit antenna configuration information to the third wireless communications device, including for example panel orientation, antenna array dimensions, antenna polarizations, panel locations, etc.

Further, in some embodiments the second wireless communications device may also send the training weights/biases to the third wireless communications device when the antenna configurations are sufficiently similar. This weight information may be used at the third wireless communications device as the starting point for neural network training between the second and third wireless communications devices. Thus, if a deep neural network has already been used and trained for a certain antenna configuration pair (e.g., between the first and second wireless communications devices in this example), the same neural network may be leveraged for future communication purposes (e.g., between the second and third wireless communications devices in this example). This may occur, for example, when a UE 115 moves to another cell with the same or similar antenna configuration, or when a BS 105 serves a new UE 115 with the same or similar antenna configuration as an old UE 115 for which the neural network information was used and trained on. In this manner, system resources may be conserved by not identifying and training the new system (e.g., between the second and third wireless communications devices in this example) from scratch.

Figure 2:
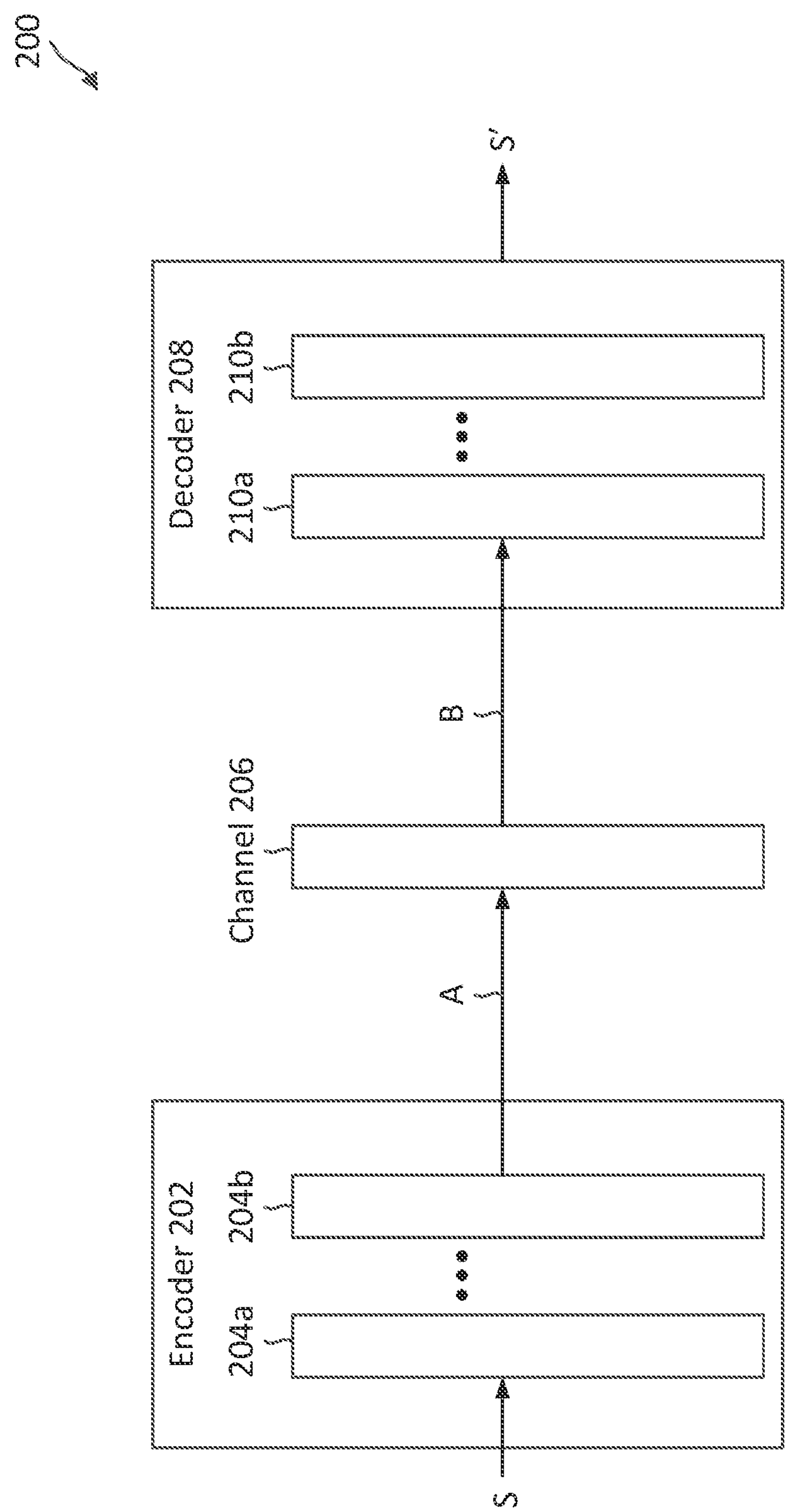
FIG. 2 illustrates an exemplary autoencoder configuration for use in wireless communications according to some embodiments of the present disclosure.

An example of an autoencoder configuration 200 between wireless communications devices is illustrated in FIG. 2. The autoencoder configuration 200 may include an encoder 202 and a decoder 208 which communicate over a channel 206. The encoder 202 may be part of a first wireless communications device and the decoder 208 part of a second wireless communications device. For example, the encoder 202 may be part of a UE 115 in the example of FIG. 1 and communicate with a decoder 208 that is part of a BS 105 or another UE 115 in various examples. As another example, the encoder 202 may be part of a BS 105 and communicate with a decoder 208 that is part of a UE 115.

The encoder 202 may include one or more layers 204*a*, including for example an input layer and one or more hidden layers. Each layer may include one or more nodes that are connected to nodes in another layer. Weights may be applied to data as it traverses the one or more layers 204*a*. The encoder 202 may also include a normalization layer 204*b*. The decoder 208 may include one or more hidden layers 210*a*, followed by an activation layer 210*b*. For example, an input S may traverse the layers 204*a* and normalization layer 204*b*, resulting in a compressed codeword A. The compressed codeword A that has a reduced dimensionality to that of input S. As the codeword A traverses the channel 206, arriving at the receiving decoder 208 as received codeword B. The original input S may be reconstructed by the hidden layers 210*a* and activation layer 210*b* as S'. The encoder 202 and the decoder 208 are trained jointly in order to recover the input S at the output as S'.

The configuration 200 is exemplary; different numbers of layers may be included in either encoder or decoder, as well as additional layers and/or functions, and/or algorithms to implement different types of neural networks, while implementing embodiments of the present disclosure. For example, according to some embodiments of the present disclosure, the first wireless communications device implementing the encoder 202 may store multiple different AI modules, each having a different neural network configuration (e.g., number of layers 204*a*, 204*b* and nodes in each layer, etc.). The AI modules may be pre-configured, and in some examples also dynamically updated (e.g., via RRC signaling or other control signaling). In other examples, the encoder 202 may not be configured with AI modules, but instead determine neural network parameters on its own to implement.

The AI module, or more generally the neural network parameters, may be determined at the encoder 202 based on one or more parameters of the first wireless communications device which houses the encoder 202. For example, the neural network parameters may be determined based on the antenna configuration parameters at the first wireless communications device, including for example antenna array dimensions (including for example a number of antennas in an array), antenna polarizations, panel orientation, a combination of parameters, and so forth.

Figure 3:
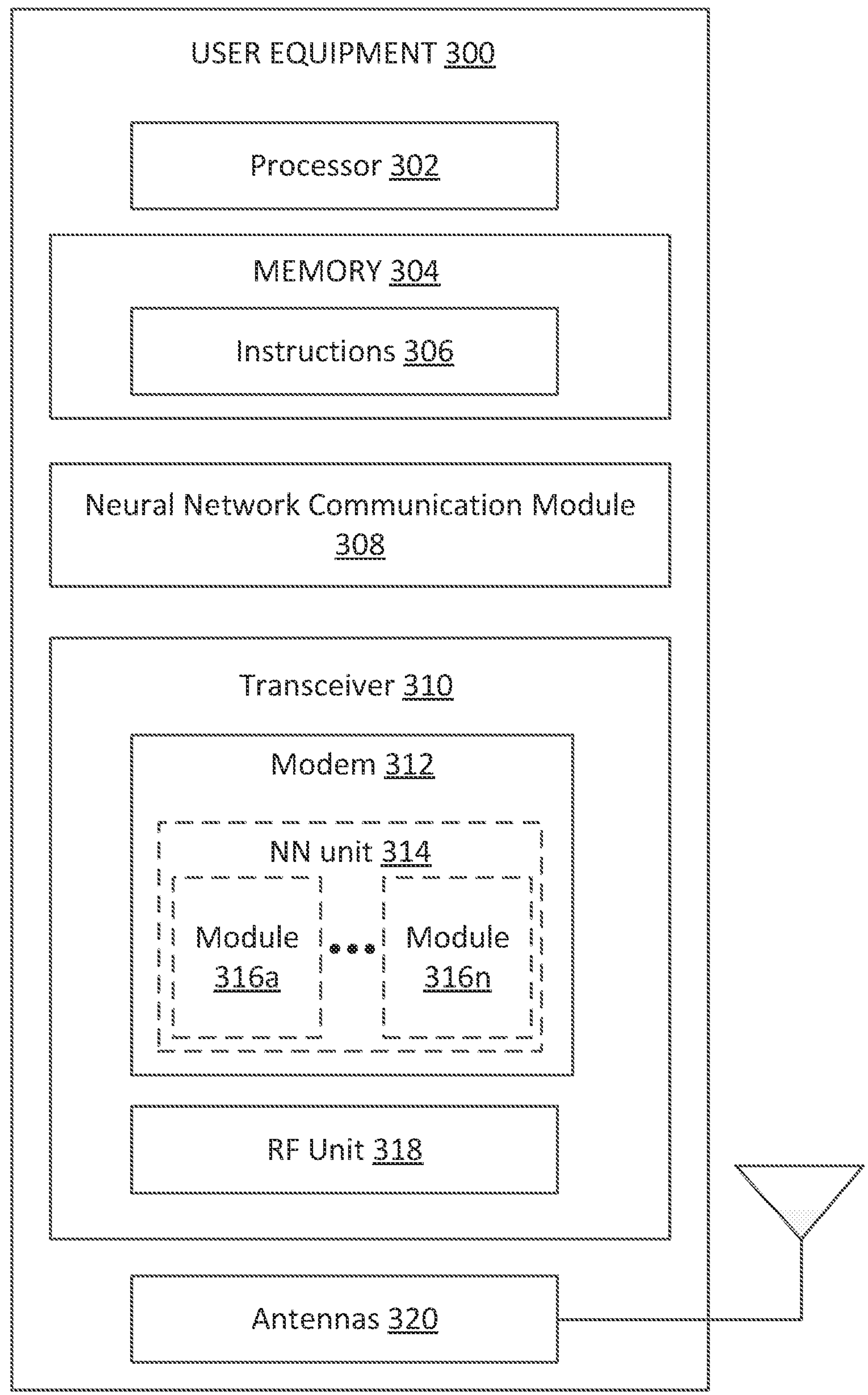
FIG. 3 is a block diagram of a user equipment (UE) according to some embodiments of the present disclosure.

FIG. 3 is a block diagram of an exemplary UE 300 according to some aspects of the present disclosure. The UE 300 may be a UE 115 discussed above in FIG. 1. As shown, the UE 300 may include a processor 302, a memory 304, a neural network communication module 308, a transceiver 310 including a modem subsystem 312 and a radio frequency (RF) unit 318, and one or more antennas 320. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with aspects of the present disclosure, for example, aspects of FIGS. 5-7B. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may include a single computer-readable statement or many computer-readable statements.

The neural network communication module 308 may be implemented via hardware, software, or combinations thereof. For example, the neural network communication module 308 may be implemented as a processor, circuit, and/or instructions 306 stored in the memory 304 and executed by the processor 302. In some instances, the neural network communication module 308 can be integrated within the modem subsystem 312. For example, the neural network communication module 308 may be implemented as a neural network unit 314, which may implement one or more machine learning algorithms illustrated as AI modules 316*a*-316*n*. In other examples, the neural network communication module 308 may be implemented by offloading the neural network processing to an application processor, such as processor 302. Moreover, the neural network communication module 308 can be implemented by a combination of software components (e.g., executed by a DSP or a general processor) and hardware components (e.g., logic gates and circuitry) within the modem subsystem 312 alone or in combination with, or solely by, an application processor such as processor 302.

The neural network communication module 308 may be used for various aspects of the present disclosure, for example, aspects of FIGS. 5-7B. The neural network communication module 308 is configured to engage in neural network configuration, training, and/or compression using a trained neural network. In some examples, the neural network communication module 308 may operate as an encoder side in cooperation with a decoder side on a receiving end. In other examples, the neural network communication module 308 may operate as a decoder side in cooperation with an encoder side on a transmitting end. The neural network communication module 308 may determine neural network parameters to use (either from preconfigured AI modules or generally) based on the configuration of the antennas 320 of the UE 115. The neural network communication module 308 may also signal antenna configuration information and neural network information to the decoder side at the receiving end, and/or trained weights, according to embodiments of the present disclosure. The signaled information may be used at the decoder side to speed up and reduce the computational burden of a new device that engages in neural network training with the decoder side. In some examples, the neural network communication module 308 may be used as part of an encoder for a first wireless communications device (such as according to the example given with respect to FIG. 1). In other examples, the neural network communication module 308 may be used as part of an encoder for a third wireless communications device according to the FIG. 1 example, which receives and implements previously provided neural network parameters and/or weights.

As shown, the transceiver 310 may include the modem subsystem 312 and the RF unit 318. The transceiver 310 can be configured to communicate bi-directionally with other devices, such as the BSs 105 and other UEs 115. The modem subsystem 312 may be configured to modulate and/or encode the data from the memory 304 and/or the neural network communication module 308 (whether implemented by the processor 302 and/or neural network unit 314) according to a modulation and coding scheme (MCS), e.g., a low-density parity check (LDPC) coding scheme, a turbo coding scheme, a convolutional coding scheme, a digital beamforming scheme, etc. As noted above, the modem subsystem 312 may include a neural network unit 314. The neural network unit 314 may include one or more AI modules 316*a*-316*n*, or implement parameters without AI modules.

The RF unit 318 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 318 may be further configured to perform analog beamforming in conjunction with the digital beamforming. Although shown as integrated together in transceiver 310, the modem subsystem 312 and the RF unit 318 may be separate devices that are coupled together at the UE 115 to enable the UE 115 to communicate with other devices.

The RF unit 318 may provide the modulated and/or processed data, e.g. data packets (or, more generally, data messages that may contain one or more data packets and other information), to the antennas 320 for transmission to one or more other devices. The antennas 320 may further receive data messages transmitted from other devices. The antennas 320 may provide the received data messages for processing and/or demodulation at the transceiver 310. The antennas 320 may include multiple antennas of similar or different designs in order to sustain multiple transmission links. The RF unit 318 may configure the antennas 320.

In an aspect, the UE 300 can include multiple transceivers 310 implementing different RATs (e.g., NR and LTE). In an aspect, the UE 300 can include a single transceiver 310 implementing multiple RATs (e.g., NR and LTE). In an aspect, the transceiver 310 can include various components, where different combinations of components can implement different RATs.

Figure 4:
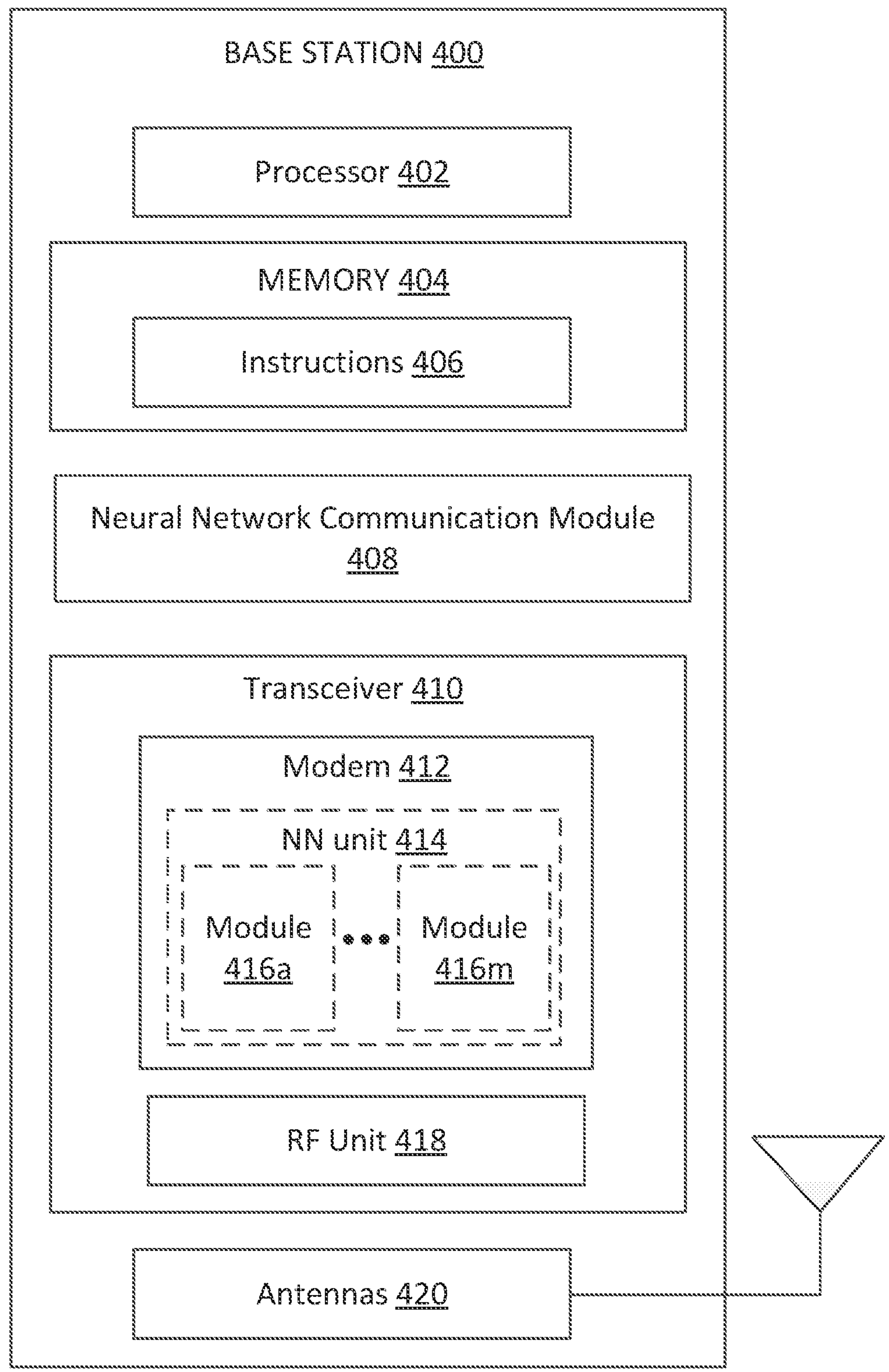
FIG. 4 is a block diagram of an exemplary base station (BS) according to some embodiments of the present disclosure.

FIG. 4 is a block diagram of an exemplary BS 400 according to some aspects of the present disclosure. The BS 400 may be a BS 105 in the network 100 as discussed above in FIG. 1. A shown, the BS 400 may include a processor 402, a memory 404, a neural network communication module 408, a transceiver 410 including a modem subsystem 412 and a RF unit 418, and one or more antennas 420. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 404 may include a non-transitory computer-readable medium. The memory 404 may store instructions 406. The instructions 406 may include instructions that, when executed by the processor 402, cause the processor 402 to perform operations described herein. Instructions 406 may also be referred to as code, which may be interpreted broadly to include any type of computer-readable statement(s) as discussed above with respect to FIG. 3.

The neural network communication module 408 may be implemented via hardware, software, or combinations thereof. For example, the neural network communication module 408 may be implemented as a processor, circuit, and/or instructions 406 stored in the memory 404 and executed by the processor 402. In some instances, the neural network communication module 408 can be integrated within the modem subsystem 412. For example, the neural network communication module 408 may be implemented as a neural network unit 414, which may implement one or more machine learning algorithms illustrated as AI modules 416*a*-416*n*. In other examples, the neural network communication module 408 may be implemented by offloading the neural network processing to an application processor, such as processor 402. Moreover, the neural network communication module 408 can be implemented by a combination of software components (e.g., executed by a DSP or a general processor) and hardware components (e.g., logic gates and circuitry) within the modem subsystem 412 alone or in combination with, or solely by, an application processor such as processor 402.

The neural network communication module 408 may be used for various aspects of the present disclosure, for example aspects of FIGS. 5-7B. The neural network communication module 408 is configured to engage in neural network configuration, training, decompression, and/or compression (depending on whether the neural network communication module 408 is operating with the BS 400 as a decoder or encoder). The neural network communication module 408 may operate in some examples as a decoder side in cooperation with an encoder side on a transmitting end. In other examples, the neural network communication module 408 may operate as an encoder side in cooperation with a decoder side on a receiving end.

The neural network configuration module 408 may receive neural network parameters used (either from pre-configured AI modules or generally) at the encoding end based on the configuration of the encoding end's antennas. The neural network communication module 408 may receive antenna configuration information and neural network information from the encoder side, and/or trained weights, according to embodiments of the present disclosure. The neural network communication module 408, when operating on the decoder side, may use the signaled information to speed up and reduce the computational burden of a new device that engages in neural network training with the decoder side. In some examples, the neural network communication module 408 may be used as part of a decoder for a second wireless communications device (such as according to the example given with respect to FIG. 1). In other examples, the neural network communication module 308 may be used as part of an encoder for a first or a third wireless communications device according to the FIG. 1 example, which determines and implements, or receives and implements, neural network parameters and/or weights, respectively.

As shown, the transceiver 410 may include the modem subsystem 412 and the RF unit 418. The transceiver 410 can be configured to communicate bi-directionally with other devices, such as the UEs 115 and/or 300 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The modem subsystem 412 may include a neural network unit 414, which may include one or more AI modules 416*a*-416*n*, and/or a storage (e.g., memory 404) to store antenna configuration information and neural network configuration information. The RF unit 418 may be configured to process (e.g., perform analog to digital conversion or digital to analog conversion, etc.) modulated/encoded data from the modem subsystem 412 (on outbound transmissions) or of transmissions originating from another source such as a UE 115 and/or UE 300. The RF unit 418 may be further configured to perform analog beamforming in conjunction with the digital beamforming, for example after processing a codeword including channel state information (with its dimensionality reduced using the neural network at the transmitting side) to estimate the channel Although shown as integrated together in transceiver 410, the modem subsystem 412 and/or the RF unit 418 may be separate devices that are coupled together at the BS 400 to enable the BS 400 to communicate with other devices.

The RF unit 418 may provide the modulated and/or processed data, e.g. data packets (or, more generally, data messages that may contain one or more data packets and other information), to the antennas 420 for transmission to one or more other devices. The antennas 420 may further receive data messages transmitted from other devices and provide the received data messages for processing and/or demodulation at the transceiver 410. The antennas 420 may include multiple antennas of similar or different designs in order to sustain multiple transmission links. In an aspect, the BS 400 can include multiple transceivers 410 implementing different RATs (e.g., NR and LTE). In an aspect, the BS 400 can include a single transceiver 410 implementing multiple RATs (e.g., NR and LTE). In an aspect, the transceiver 410 can include various components, where different combinations of components can implement different RATs.

Figure 5:
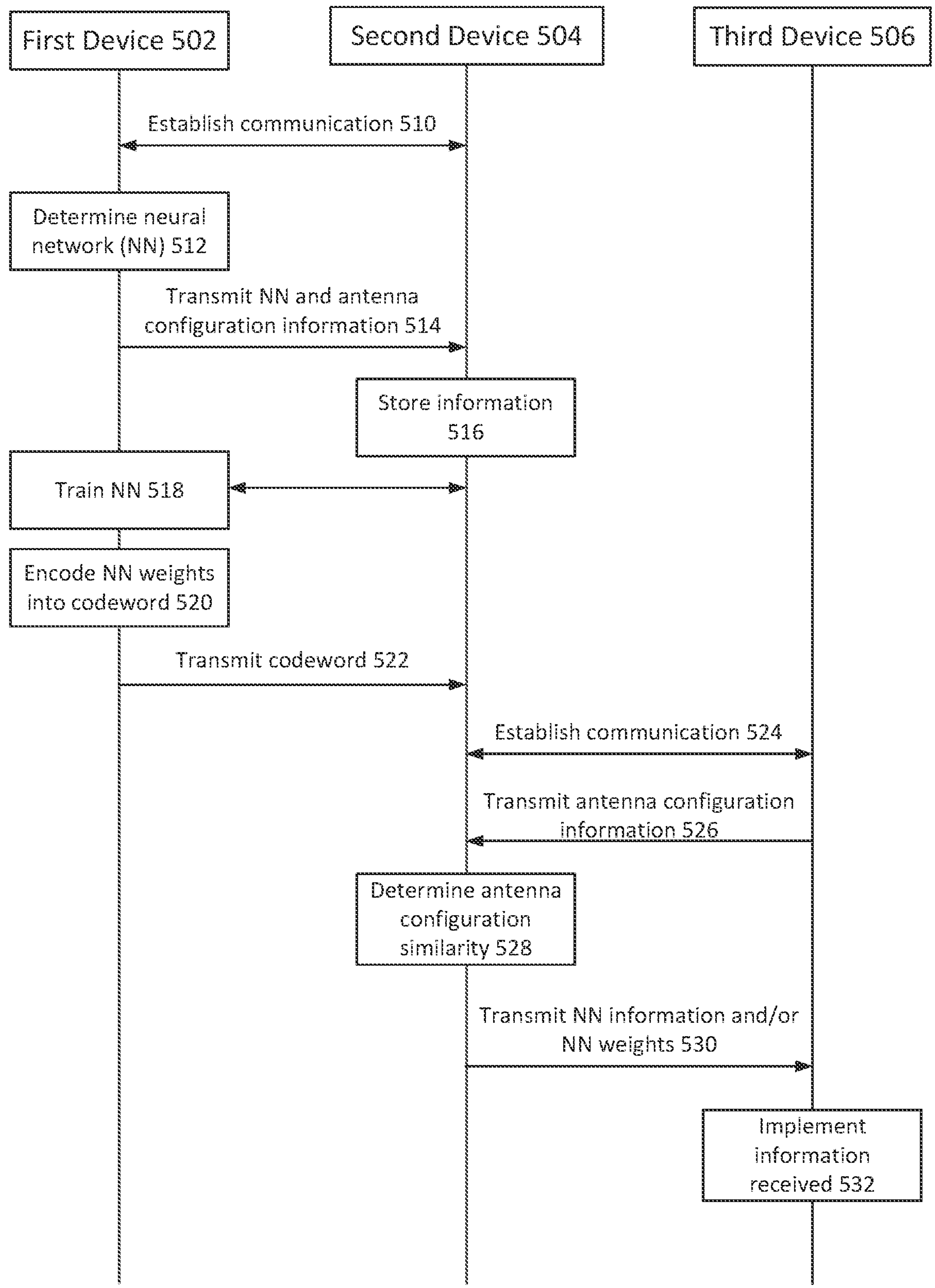
FIG. 5 illustrates a protocol diagram of a neural network and antenna configuration indication scheme according to some embodiments of the present disclosure.

Turning now to FIG. 5, illustrated is a protocol diagram of a neural network and antenna configuration indication scheme 500 according to some embodiments of the present disclosure. Communication may be between a first wireless communications device 502, a second wireless communications device 504, and/or a third wireless communications device 506. For example, first wireless communications device 502 may be a UE while second wireless communications device 504 a BS and third wireless communications device 506 another UE. As another example, first wireless communications device 502 may be a BS and second wireless communications device 504 a UE, with third wireless communications device 506 another BS. All three wireless communications devices may be UEs in another example.

At action 510, the first wireless communications device 502 and the second wireless communications device 504 establish communication with each other. This may include one or more of the aspects of establishing communication as discussed above with respect to FIG. 1, for example.

At action 512, the first wireless communications device 502 (described in FIG. 5 as the source of transmissions using a neural network, and therefore comprising the encoder such as encoder 202 discussed with respect to FIG. 2) determines a neural network to use in autoencoder communications with the second wireless communications device 504. As further discussed with respect to FIG. 3 (where the first wireless communications device 502 is a UE) or FIG. 4 (where the first wireless communications device 502 is a BS), this may be performed by a neural network communication module 308/408 (respectively). This may be based, for example, on an antenna configuration at the first wireless communications device 502, including for example antenna array dimensions (including for example a number of antennas in an array), antenna polarizations, panel orientation, a combination of parameters, and so forth.

In some embodiments, this involves the first wireless communications device 502 selecting an AI module from among possibly a plurality of different AI modules configured at the first wireless communications device 502 (e.g., pre-installed at the device or received via one or more configuration updates from a network, and/or some combination thereof). For example, the first wireless communications device 502 may be pre-configured with a set of AI modules that each have different neural network parameters, such as number of layers, number of nodes per layer, machine learning algorithm (overall and/or per layer, etc.), and so forth. The possible AI modules may be pre-configured at the second wireless communications device 504 (or may have been the source of the preconfiguring at the first wireless communications device 502 where, for example, the second wireless communications device 504 is a BS 105).

In other embodiments, this involves the first wireless communications device 502 may not be provisioned with pre-configured AI modules. In this situation, the first wireless communications device 502 may determine a number of layers, a number of nodes per layer, etc., dynamically for use in encoding. Thus, each aspect of the neural network to use may be selected. Alternatively, the first wireless communications device may be provisioned with pre-configured layer options, but not nodes per layer, such that the first wireless communications device 502 may select from the pre-configured layers options, and dynamically determine a number of nodes. Or, alternatively, the number of nodes options may be pre-configured but the number of layers may be dynamically determined by the first wireless communications device 502.

With the neural network determined, at action 514 the first wireless communications device 502 transmits the neural network information together with antenna configuration information of the first wireless communications device 502 to the second wireless communications device 504.

For example, where the action 512 involved selecting from a number of pre-provisioned AI modules, action 514 may involve the first wireless communications device 502 transmitting an index (e.g., an implicit signaling of neural network parameters) that identifies the AI module selected to the second wireless communications device 504 together with the antenna configuration information. As noted above, in these situations the second wireless communications device 504 may use the index to identify the AI module that has been provisioned at the second wireless communications device 504 as well. Thereby, the second wireless communications device 504 may know via the AI module the relevant neural network parameters. This helps to reduce signaling overhead and thereby improves efficiency when transmitting the neural network information indication together with antenna configuration information.

As another example, where the action 512 involved determining explicit neural network parameters, action 514 may instead involve the first wireless communications device 502 transmitting explicit neural network parameters (e.g., explicit signaling of the parameters) to the second wireless communications device 504 together with the antenna configuration information. This may involve explicitly signaling the number of layers of the neural network, the number of nodes per layer, one or more algorithms used, etc. Or, where some of the parameters may be pre-provisioned and others not, this may involve implicitly signaling the pre-provisioned parts and explicitly signaling the parts that were not pre-provisioned.

In examples where the first wireless communications device 502 is a UE 115, the transmission 514 may be done on an uplink resource, such as for example uplink RRC message, MAC-CE, or PUCCH. In examples where the first wireless communications device 502 is a BS 105, the transmission 514 may be done on a downlink resource, such as for example RRC, MAC-CE, or PDCCH (with RRC signaling being less dynamic and PDCCH being more dynamic) In examples where both the first wireless communications device 502 and the second wireless communications device 504 are UEs 115, the transmission 514 may be done via sidelink control or sidelink higher-layer signaling.

At action 516, the second wireless communications device 504 stores the received neural network information and the corresponding antenna configuration information. This may be stored in a searching manner, enabling the second wireless communications device 504 to search based on antenna configuration parameter (one or more parameters) to see if a new wireless communications device's antenna configuration is the same as at least one parameter, the same as multiple parameters, or within a similarity threshold of one or more antenna configuration parameters of a given entry in the storage of the second wireless communications device 504. This may be stored in a memory at the second wireless communications device 504, while in other examples this may be stored in a memory accessible to the second wireless communications device 504 over a network.

At action 518, the first wireless communications device 502 and the second wireless communications device 504 engage in training the neural network determined at action 512. As noted previously, this may be a collaborative and iterative process where the first wireless communications device 502 jointly trains the neural network with the second wireless communications device to achieve the same or sufficiently similar output as the input training sequence(s). For example, the first wireless communications device 502 may modify one or more training weights and/or biases for one or more nodes in one or more layers of the neural network at the first wireless communications device 502. Upon completion of training, compression of input data will result in a codeword of reduced dimensionality that improves transmission efficiency and reduces resource utilization, which is recoverable at the decoder side (i.e., at the second wireless communications device 504 in this example).

At action 520, the first wireless communications device 502 may encode results of the training from action 518, for example training weights and/or biases, into a codeword. As this may be a notably large dataset, the first wireless communications device 504 may, if necessary, request a grant of reserved transmission resources so that the transmission may avoid collisions with other transmissions. This may be from the second wireless communications device 504 when it is a BS, or from a third device where both wireless communications devices are UEs, to name a few examples.

At action 522, the first wireless communications device 502 transmits the codeword (including the neural network training results) to the second wireless communications device 504. In some examples, the first wireless communications device 502 transmit the training weights without encoding, thus proceeding from action 518 to action 522, where the information is transmitted to the second wireless communications device 504. The second wireless communications device 504 receives this information and may store it with the same information stored at action 516, so the training data may be accessible when searching based on at least one antenna configuration parameter as discussed above.

At action 524, FIG. 5 illustrates the second wireless communications device 504 establishing communication with a third wireless communications device 506, which may be a UE 115 or a BS 105. For example, the second wireless communications device 504 may be a BS 105 and the third wireless communications device 506 another UE 115 entering coverage of the BS 105. As another example, the second wireless communications device 504 may be a UE 115 entering coverage of a new BS 105 as the third wireless communications device 506. As yet another example, the second wireless communications device 504 and the third wireless communications device 506 may both be UEs 115 establishing sidelink communications. While illustrated as being subsequent to action 522, action 524 may occur before, during, or after the events discussed with respect to action 522.

At action 526, the third wireless communications device 506 transmits antenna configuration information for the third wireless communications device 506 to the second wireless communications device 504. This may include one or more parameters of the third wireless communications device 506's antenna configuration, for example panel orientation, antenna array dimensions, antenna polarizations, panel locations, etc.

At action 528, the second wireless communications device 504 determines a level of antenna configuration similarity of the third wireless communications device 506 to any stored antenna configurations at the second wireless communications device 504. This may involve looking for a match of multiple antenna configuration parameters, a match of one of the multiple antenna configuration parameters (e.g., array dimensions as just one example), within a similarity threshold of multiple antenna configuration parameters, or within a similarity threshold of one of the multiple antenna configuration parameters.

If a similarity is determined at action 528, at action 530 the second wireless communications device 504 may transmit neural network information to the third wireless communications device 506 to aid in neural network selection and/or training at the third wireless communications device 506. By way of illustrative example, where one or more parameters of the antenna configuration at the third wireless communications device 506 matches/is sufficiently similar to one or more antenna configuration parameters of the first wireless communications device 502, the second wireless communications device 504 may identify the neural network parameters (e.g., an index for an AI module where pre-provisioned, or explicit neural network parameters such as number/type of layers, number of nodes, etc., or some combination thereof) from storage to send to the third wireless communications device 506.

Further, if the second wireless communications device 504 also stored neural network weights associated with the matching/similar antenna configuration parameter(s) determined from action 528, the second wireless communications device 504 may transmit those parameters as well. In some examples, this may be transmitted without compression, while in other examples this may be compressed as well.

In examples where the second wireless communications device 504 is a BS 105, and the third wireless communications device 506 is a UE 115, the transmission at action 530 may be an instruction for the UE 115 to implement. In examples where the second wireless communications device 504 is a UE 115 and the third wireless communications device 506 is a UE 115, the transmission at action 530 may be a recommendation for the BS 105.

At action 532, the third wireless communications device 506 implements the received neural network information from the second wireless communications device 504. As a result, if a neural network has already been utilized (e.g., as signaled at action 514 above with antenna configuration information), and further has been trained (e.g., as signaled at action 522 above), for a certain antenna configuration pair (e.g., between first wireless communications device 502 and second wireless communications device 504), the same neural network may be leveraged for future communication purposes (e.g., with third wireless communications device 506 in the above example). For example, this may be leveraged when a UE 115 moves to another cell with the same or similar antenna configuration; as another example, this may be leveraged when a BS 105 serves a new UE 115 with the same or similar antenna configuration as a prior UE 115 for which the neural network has already been utilized and trained. This may conserve system resources by not requiring the new device to identify and train the new system (e.g., between the second wireless communications device 504 and the third wireless communications device 506 in this example) from default parameters.

Figure 6:
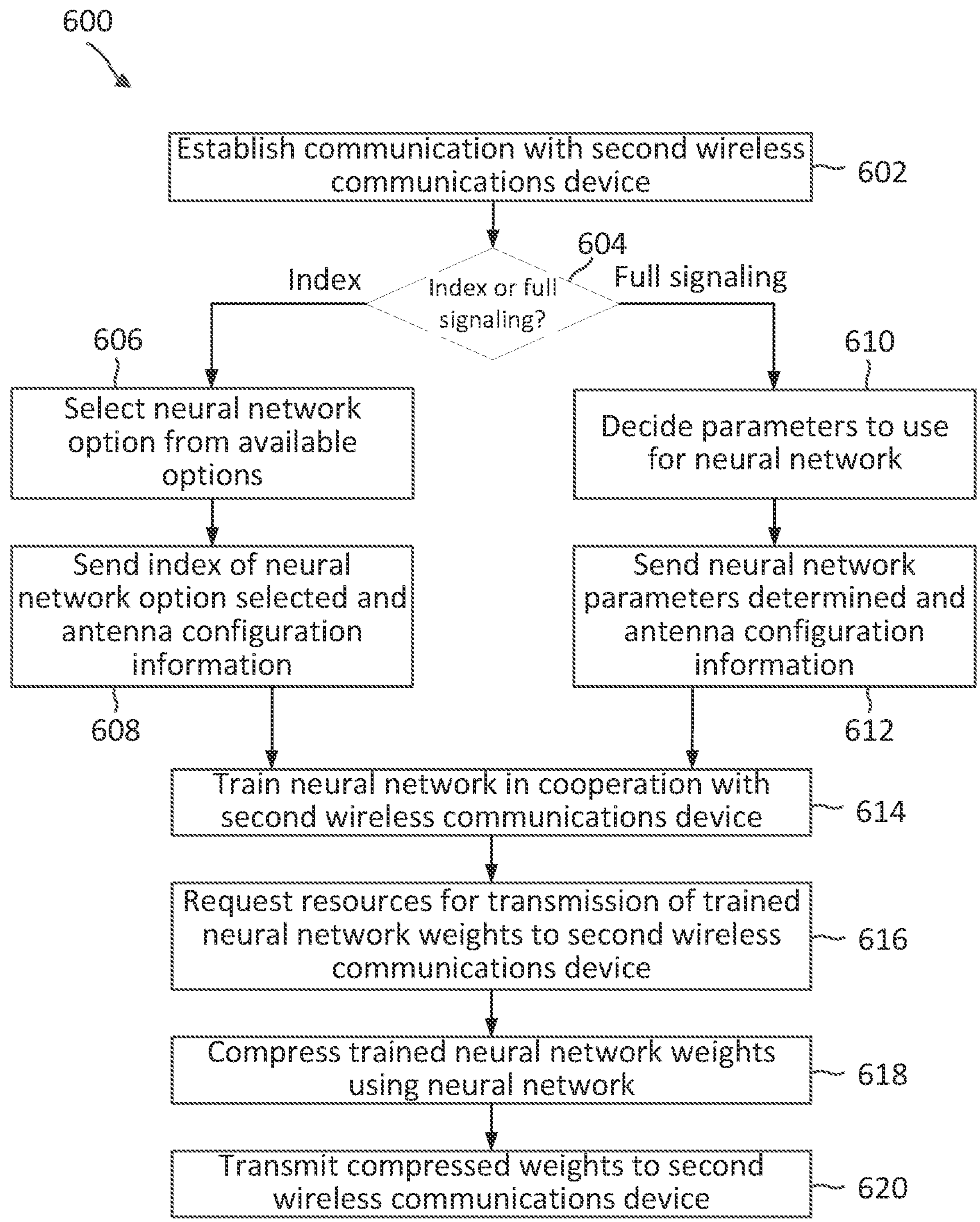
FIG. 6 illustrates a flow diagram of a wireless communication method according to some embodiments of the present disclosure.

FIG. 6 illustrates a flow diagram of a wireless communication method 600 according to some embodiments of the present disclosure. Aspects of the method 600 may be executed by a wireless communication device, such as the UEs 115 and/or 300 utilizing one or more components, such as the processor 302, the memory 304, the neural network communication module 308, the transceiver 310, the modem 312, the one or more antennas 316, and various combinations thereof. Alternatively, the wireless communications device may be the BSs 105 and/or 400 utilizing one or more components, such as the processor 402, the memory 404, the neural network communication module 408, transceiver 410, the modem 412, the one or more antennas 416, and various combinations thereof. For sake of simplicity of discussion, reference will again be made generally to a first wireless communications device and a second wireless communications device, with either device capable of being a UE or BS according to embodiments of the present disclosure. As illustrated, the method 600 includes a number of enumerated steps, but embodiments of the method 600 may include additional steps before, during, after, and in between the enumerated steps. For example, in some instances one or more aspects of methods 700, 730 may be implemented as part of method 600. Further, in some embodiments, one or more of the enumerated steps may be omitted or performed in a different order.

At block 602, a first wireless communications device establishes communication with a second wireless communications device, for example as discussed above with respect to action 510 of FIG. 5.

At decision block 604, if the first wireless communications device has been pre-provisioned with multiple possible AI modules (each AI module specifying a different set of neural network parameters for implementation), the method 600 may proceed to block 606.

At block 606, the first wireless communications device selects a neural network option from among the available AI module options. The first wireless communications device may do so based on one or more parameters of the antenna configuration at the first wireless communications device.

At block 608, the first wireless communications device sends an identifier of the neural network option, i.e. the AI module identifier, selected at block 606 to the second wireless communications device. This may be, for example, an index value that the receiving second wireless communications device recognizes to associate with the corresponding pre-provisioned AI module at the second wireless communications device. The first wireless communications device may transmit the identifier of the neural network option together with antenna configuration information of the first wireless communications device. That may be over RRC signaling, MAC-CE, or PDCCH where the first wireless communications device is a BS 105, or MAC-CE or PUCCH where the first wireless communications device is a UE 115.

Returning to decision block 604, if the first wireless communications device has not been pre-provisioned with multiple possible AI modules, the method 600 instead proceeds to block 610.

At block 610, the first wireless communications device determines parameters to use for the neural network at the first wireless communications device. This may include determining a number of layers, a number of nodes per layer, etc., dynamically for use in encoding. Thus, each aspect of the neural network to use may be selected. Alternatively, layer options may be pre-configured, but not nodes per layer, or the number of nodes options may be pre-configured but the number of layers may be dynamically determined.

At block 612, the first wireless communications device sends explicit information regarding the determined neural network from block 610 to the second wireless communications device. For example, this may involve explicitly signaling the number of layers of the neural network, the number of nodes per layer, one or more algorithms used, etc. Or, where some of the parameters may be pre-provisioned and others not, this may involve implicitly signaling the pre-provisioned parts and explicitly signaling the parts that were not pre-provisioned, as noted above with respect to action 514. Similar to block 608, the first wireless communications device may transmit the explicit information regarding the neural network determined together with antenna configuration information of the first wireless communications device to the second wireless communications device. That may be over RRC signaling, MAC-CE, or PDCCH where the first wireless communications device is a BS 105, or MAC-CE or PUCCH where the first wireless communications device is a UE 115.

From either block 608 or block 612, the method 600 proceeds to block 614. At block 614, the first wireless communications device trains the neural network selected at block 606 or determined at block 610 in cooperation with (i.e., jointly) with the second wireless communications device. This may involve feed forward and/or feed back operations in order to optimize a reconstructed estimate of an input at the first wireless communications device at the output of the second wireless communications device.

At block 616, the first wireless communications device may request one or more transmission resources in order to transmit one or more trained neural network weights to the second wireless communications device for storage in association with antenna configuration information of the first wireless communications device. Where the first wireless communications device is a UE and the second wireless communications device is a BS, for example, the request for transmission resources may be directed to the BS. Where the second wireless communications device is also a UE, this may be to a BS or to neighboring devices to clear a channel, to name another example.

At block 618, the first wireless communications device compresses the trained neural network weights from block 614 using the neural network encoding side at the first wireless communications device. This may result in a codeword for transmission.

At block 620, the first wireless communications device transmits the codeword resulting from block 618 over a channel to the second wireless communications device. That may be over PDSCH where the first wireless communications device is a BS 105, or PUSCH where the first wireless communications device is a UE 115. Alternatively to blocks 618 and 620, instead of compressing the trained neural network weights from block 614, the first wireless communications device may transmit the trained neural network weights to the second wireless communications device using conventional approaches, again for example over PDSCH (where the first wireless communications device is a BS 105) or PUSCH (where UE 115). Thus, block 618 may be optional—where not included, block 620 includes transmitting the trained neural network weights without the compression.

Figure 7A:
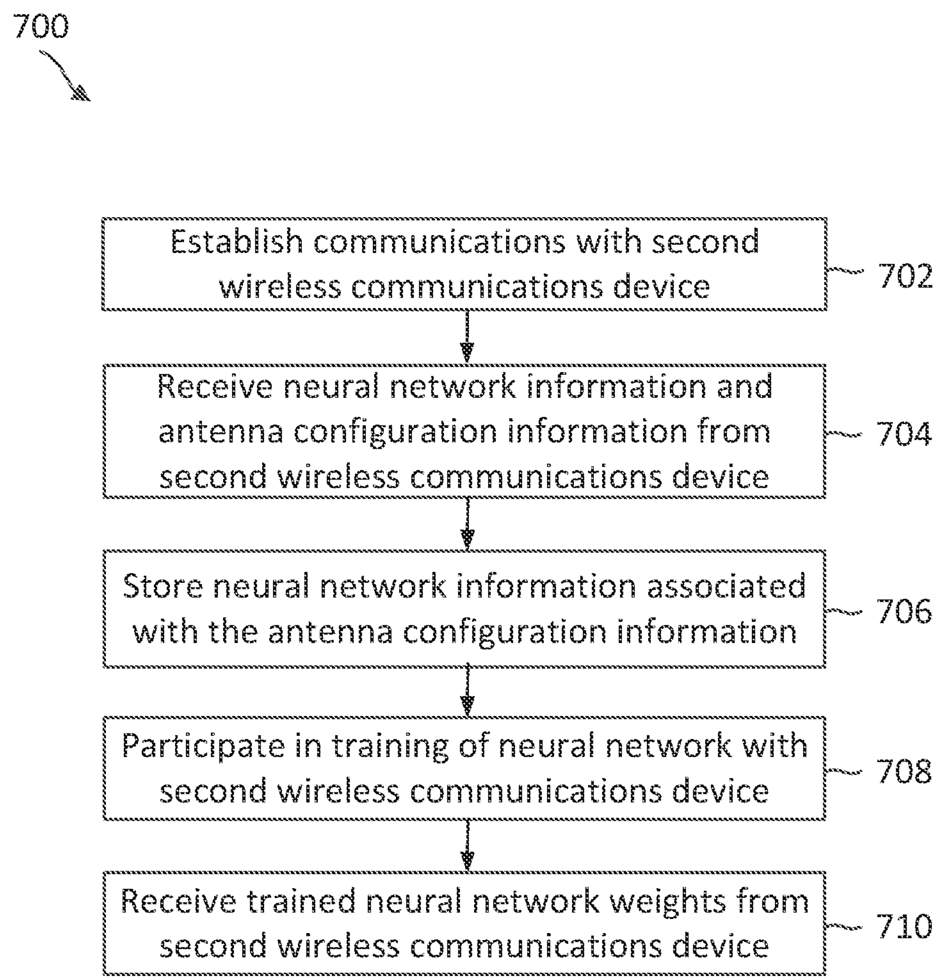
FIG. 7A illustrates a flow diagram of a wireless communication method according to some embodiments of the present disclosure.

FIG. 7A illustrates a flow diagram of a wireless communication method 700 according to some embodiments of the present disclosure. Aspects of the method 700 may be executed by a wireless communication device, such as the UEs 115 and/or 300 utilizing one or more components, such as the processor 302, the memory 304, the neural network communication module 308, the transceiver 310, the modem 312, the one or more antennas 316, and various combinations thereof. Alternatively, the wireless communications device may be the BSs 105 and/or 400 utilizing one or more components, such as the processor 402, the memory 404, the neural network communication module 408, transceiver 410, the modem 412, the one or more antennas 416, and various combinations thereof. For sake of simplicity of discussion, reference will again be made generally to a first wireless communications device and a second wireless communications device, with either device capable of being a UE or BS according to embodiments of the present disclosure. Thus, while reference is to a first wireless communications device and a second wireless communications device just as was done with respect to FIG. 6, the method 700 describes operation with reference to the device receiving neural network and antenna configuration information.

As illustrated, the method 700 includes a number of enumerated steps, but embodiments of the method 700 may include additional steps before, during, after, and in between the enumerated steps. For example, in some instances one or more aspects of methods 600, 730 may be implemented as part of method 700. Further, in some embodiments, one or more of the enumerated steps may be omitted or performed in a different order.

At block 702, a first wireless communications device establishes communication with a second wireless communications device, for example as discussed above with respect to action 510 of FIG. 5 as well as block 602 of FIG. 6.

At block 704, the first wireless communications device receives neural network information and antenna configuration information of the second wireless communications device. For example, where the second wireless communications device selected an AI module from multiple pre-provisioned at the second wireless communications device (and in some examples pre-provisioned at the first wireless communications device in a receiving mode as well), the neural network information may be an index value or other small representation of which AI module has been selected. Alternatively, the neural network information may be explicitly signaled from the second wireless communications device, which may occur in situations where the second wireless communications device determines parameters to use for the neural network at the second wireless communications device (such as number of layers, a number of nodes per layer, etc., dynamically for use in encoding).

At block 706, the first wireless communications device stores the received neural network information and the corresponding antenna configuration information from the second wireless communications device, for example as discussed with respect to action 516 of FIG. 5. The first wireless communications device may subsequently search its storage based on a characteristic, such as one or more antenna configuration parameters, in order to determine whether a new device matches or meets a similarity threshold.

At block 708, the first wireless communications device coordinates with the second wireless communications device in training (i.e., jointly training) the neural network identified at block 704 in use at the second wireless communications device.

At block 710, the first wireless communications device receives one or more weights and/or biases from the second wireless communications device once training from block 708 is completed. That may be over PUSCH where the first wireless communications device is a BS 105, or PDSCH where the first wireless communications device is a UE 115.

Figure 7B:
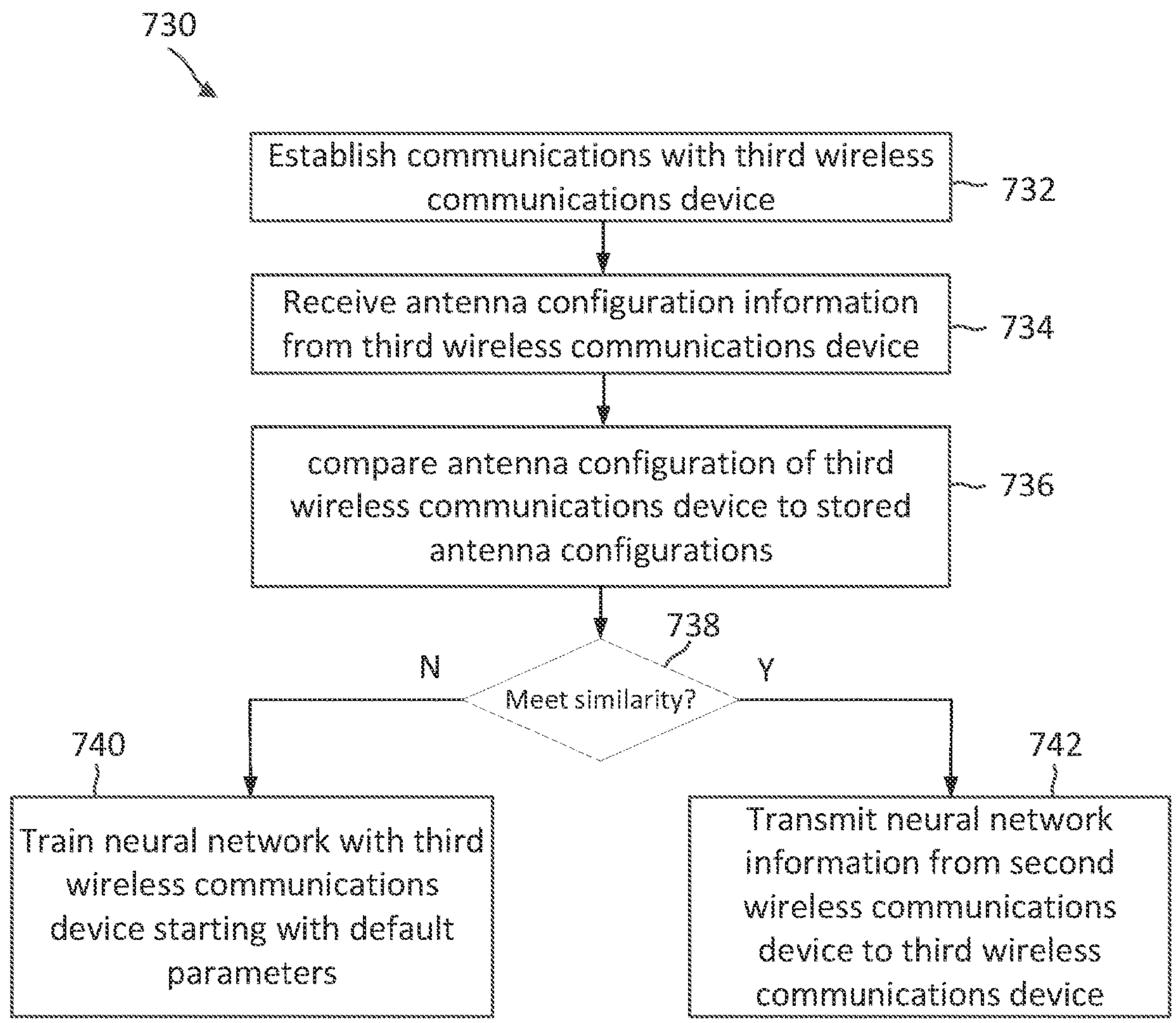
FIG. 7B illustrates a flow diagram of a wireless communication method according to some embodiments of the present disclosure.

In addition to the aspects described above with respect to FIG. 7A, further aspects may occur as illustrated in FIG. 7B, which illustrates a flow diagram of a wireless communication method 730 according to some embodiments of the present disclosure. Aspects of the method 730 may be executed by a wireless communication device, such as the UEs 115 and/or 300 utilizing one or more components, such as the processor 302, the memory 304, the neural network communication module 308, the transceiver 310, the modem 312, the one or more antennas 316, and various combinations thereof. Alternatively, the wireless communications device may be the BSs 105 and/or 400 utilizing one or more components, such as the processor 402, the memory 404, the neural network communication module 408, transceiver 410, the modem 412, the one or more antennas 416, and various combinations thereof. For sake of simplicity of discussion, reference will again be made generally to a first wireless communications device and a second wireless communications device, with either device capable of being a UE or BS according to embodiments of the present disclosure.

As illustrated, the method 700 includes a number of enumerated steps, but embodiments of the method 700 may include additional steps before, during, after, and in between the enumerated steps. For example, in some instances one or more aspects of methods 600, 700 may be implemented as part of method 730. For example, aspects of method 730 may occur after the events of method 700 discussed above. Thus, the first wireless communications device may already have received neural network information, antenna configuration information, and/or neural network weights for the associated neural network information and antenna configuration information from a second wireless communications device. Further, in some embodiments, one or more of the enumerated steps may be omitted or performed in a different order.

At block 732, the first wireless communications device establishes communication with a third wireless communications device, such as discussed above with respect to action 524 of FIG. 5. For example, where the first wireless communications device is a BS 105, the third wireless communications device may be a UE 115. As another example, where the first wireless communications device is a UE 115, the third wireless communications device may be another UE 115 or a BS 105.

At block 734, the first wireless communications device receives antenna configuration information from the third wireless communications device, such as discussed above with respect to action 526 of FIG. 5.

Upon receiving the antenna configuration information regarding the configuration at the third wireless communications device, at block 736 the first wireless communications device may compare the received antenna configuration information regarding the third wireless communications device to stored antenna configuration information, including the antenna configuration information stored at the first wireless communications device received previously from the second wireless communications device (e.g., according to blocks 704 and 706 of FIG. 7A above).

At decision block 738, if the antenna configuration information of the third wireless communications device does not meet a similarity threshold for any stored antenna configuration information, the method 730 may proceed to block 740. For example, in some embodiments the similarity threshold is a match threshold of multiple antenna configuration parameters, while in other embodiments the similarity threshold is a match threshold of one of the multiple antenna configuration parameters (e.g., array dimensions as just one example). As yet another example, the similarity threshold comprises a level of similarity to multiple antenna configuration parameters (e.g., passing a similarity threshold for each individual parameter from the multiple parameters, or an average of the similarities are compared to a combined threshold, or a weighted average to weight one or more particular parameters more than the others). As another example, the similarity threshold comprises a similarity threshold to one of multiple antenna configuration parameters.

At block 740, the first wireless communications device engages in training the neural network with the third wireless communications device using default parameters.

Returning to decision block 738, if instead the antenna configuration information of the third wireless communications device meets the similarity threshold for a stored antenna configuration entry at the first wireless communications device, the first wireless communications device transmits neural network information associated with the stored antenna configuration entry to the third wireless communications device. For example, the neural network information may include an identification of the neural network parameters from the stored information (e.g., an index for an AI module where pre-provisioned, or explicit neural network parameters such as number/type of layers, number of nodes, etc., or some combination thereof). This may be used by the third wireless communications device to aid in neural network selection and/or training. Further, if neural network weights are also stored with the antenna configuration entry, the first wireless communications device may transmit those weights as well, either with or without compression. The neural network information may be transmitted as part of an instruction to implement the information (e.g., where the first wireless communications device is a BS 105) or a recommendation to implement (e.g., where the first wireless communications device is a UE 115 and the third wireless communications device is a BS 105). This may conserve system resources by not requiring the new device to identify and train the new system (e.g., between the first wireless communications device and the third wireless communications device in this example) from default parameters.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, “or” as used in a list of items (for example, a list of items prefaced by a phrase such as “at least one of” or “one or more of”) indicates an inclusive list such that, for example, a list of [at least one of A, B, or C] means A or B or C or AB or AC or BC or ABC (i.e., A and B and C).

Examples of the present disclosure may include the following clauses:

1. A method of wireless communication, comprising:

establishing, by a first wireless communications device, communication with a second wireless communications device;

determining, by the first wireless communications device, a neural network to use for the communication with the second wireless communications device based on an antenna configuration of the first wireless communications device; and transmitting, by the first wireless communications device, antenna configuration information and at least one neural network parameter based on the neural network to the second wireless communications device.

2. The method of clause 1, wherein:

the determining further comprises selecting the neural network from a plurality of neural networks, and the at least one neural network parameter comprises an identifier of the selected neural network.

3. The method of clause 1 or clause 2, wherein:

the first wireless communications device comprises a user equipment and the second wireless communications device comprises a base station, and the transmitting is on a physical uplink control channel.

4. The method of clause 1 or clause 2, wherein:

the first wireless communications device comprises a base station and the second wireless communications device comprises a user equipment, and the transmitting is on a physical downlink control channel.

5. The method of clause 1 or clause 2, wherein:

the first wireless communications device comprises a first user equipment (UE) and the second wireless communications device comprises a second UE, and the transmitting is on a physical sidelink control channel.

6. The method of any one of clauses 1 to 5, further comprising:

training, by the first wireless communications device, the neural network in coordination with the second wireless communications device; and transmitting, by the first wireless communications device, at least one training weight resulting from the training to the second wireless communications device.

7. The method of any one of clauses 1 to 6, wherein the antenna configuration information comprises a panel orientation of an antenna array of the first wireless communications device, a dimension of the antenna array, and polarization information of the antenna array.

8. A method of wireless communications, comprising:

establishing, by a first wireless communications device, communication with a second wireless communications device;

receiving, by the first wireless communications device from the second wireless communications device, antenna configuration information of an antenna configuration at the second wireless communications device and at least one neural network parameter of a neural network at the second wireless communications device for the communication; and storing, by the first wireless communications device, the antenna configuration information and the at least one neural network parameter.

9. The method of clause 8, further comprising:

establishing, by the first wireless communications device, a second communication with a third wireless communications device.

10. The method of clause 9, further comprising:

determining, by the first wireless communications device, that an antenna configuration of the third wireless communications device shares a characteristic with the antenna configuration information from the second wireless communications device; and transmitting, by the first wireless communications device in response to the determining, the at least one neural network parameter to the third wireless communications device for use for the second communication.

11. The method of clause 8 or clause 9, further comprising:

coordinating, by the first wireless communications device, with the second wireless communications device to train the neural network; and receiving, by the first wireless communications device in response to the coordinating, at least one training weight for the neural network from the second wireless communications device.

12. The method of clause 11, further comprising:

determining, by the first wireless communications device, that an antenna configuration of the third wireless communications device shares a characteristic with the antenna configuration at the second wireless communications device; and transmitting, by the first wireless communications device in response to the determining, the at least one neural network parameter and the at least one training weight to the third wireless communications device for use for the second communication.

13. The method of clause 11 or clause 12, further comprising:

providing, by the first wireless communications device to the second wireless communications device, an allocation of resources on which the at least one training weight is received.

14. The method of any of clauses 8 to 13, wherein the neural network comprises one from among a plurality of neural networks preconfigured at the first wireless communications device and the second wireless communications device.

15. The method of any of clauses 8 to 14, wherein the antenna configuration information comprises a panel orientation of an antenna array of the second wireless communications device, a dimension of the antenna array, and polarization information of the antenna array.

16. A first wireless communications device, comprising:

a transceiver configured to establish communication with a second wireless communications device; and a processor configured to determine a neural network to use for the communication with the second wireless communications device based on an antenna configuration of the first wireless communications device, wherein the transceiver is further configured to transmit antenna configuration information and at least one neural network parameter based on the neural network to the second wireless communications device.

17. The first wireless communications device of clause 16, wherein:

the processor is further configured, for the determination, to select the neural network from a plurality of neural networks, and the at least one neural network parameter comprises an identifier of the selected neural network.

18. The first wireless communications device of clause 16 or clause 17, wherein:

the first wireless communications device comprises a user equipment and the second wireless communications device comprises a base station, and the transmission is on a physical uplink control channel.

19. The first wireless communications device of clause 16 or clause 17, wherein:

the first wireless communications device comprises a base station and the second wireless communications device comprises a user equipment, and the transmission is on a physical downlink control channel.

20. The first wireless communications device of clause 16 or clause 17, wherein:

the first wireless communications device comprises a first user equipment (UE) and the second wireless communications device comprises a second UE, and the transmission is on a physical sidelink control channel.

21. The first wireless communications device of any one of clauses 16 to 20, wherein:

the processor is further configured to train the neural network in coordination with the second wireless communications device, and the transceiver is further configured to transmit at least one training weight resulting from the training to the second wireless communications device.

22. The first wireless communications device of any one of clauses 16 to 21, wherein the processor comprises a neural network unit integrated with the transceiver.

23. The first wireless communications device of any one of clauses 16 to 21, wherein the processor comprises an application processor separate from the transceiver.

24. A first wireless communications device, comprising:

a transceiver configured to:

establish communication with a second wireless communications device; and receive, from the second wireless communications device, antenna configuration information of an antenna configuration at the second wireless communications device and at least one neural network parameter of a neural network at the second wireless communications device for the communication; and a processor configured to store the antenna configuration information and the at least one neural network parameter at the first wireless communications device.

25. The first wireless communications device of clause 24, wherein the transceiver is further configured to:

establish a second communication with a third wireless communications device.

26. The first wireless communications device of clause 25, wherein:

the processor is further configured to determine that an antenna configuration of the third wireless communications device shares a characteristic with the antenna configuration information from the second wireless communications device; and the transceiver is further configured to transmit, in response to the determination, the at least one neural network parameter to the third wireless communications device for use for the second communication.

27. The first wireless communications device of clause 24 or clause 25, wherein:

the processor is further configured to coordinate with the second wireless communications device to train the neural network, and the transceiver is further configured to receive, in response to the coordination, at least one training weight for the neural network from the second wireless communications device.

28. The first wireless communications device of clause 27, wherein:

the processor is further configured to determine that an antenna configuration of the third wireless communications device shares a characteristic with the antenna configuration at the second wireless communications device; and the transceiver is further configured to transmit, in response to the determination, the at least one neural network parameter and the at least one training weight to the third wireless communications device for use for the second communication.

29. The first wireless communications device of any one of clauses 24 to 28, wherein the processor comprises a neural network unit integrated with the transceiver.

30. The first wireless communications device of any one of clauses 24 to 28, wherein the processor comprises an application processor separate from the transceiver.

Examples of the present disclosure may include the following clauses:

1. A non-transitory computer-readable medium having program code recorded thereon, the program code comprising:

code for causing a first wireless communications device to establish communication with a second wireless communications device;

code for causing the first wireless communications device to determine a neural network to use for the communication with the second wireless communications device based on an antenna configuration of the first wireless communications device; and code for causing the first wireless communications device to transmit antenna configuration information and at least one neural network parameter based on the neural network to the second wireless communications device.

2. The non-transitory computer-readable medium of clause 1, wherein the neural network comprises one from among a plurality of neural networks preconfigured at the first wireless communications device.

3. The non-transitory computer-readable medium of clause 2, wherein:

the code for causing the first wireless communications device to determine the neural network further comprises code for causing the first wireless communications device to select the neural network from the plurality of neural networks, and the at least one neural network parameter comprises an identifier of the selected neural network.

4. The non-transitory computer-readable medium of clause 1, wherein the at least one neural network parameter comprises one or more explicit parameters of the neural network.

5. The non-transitory computer-readable medium of clause 1, wherein:

the first wireless communications device comprises a user equipment and the second wireless communications device comprises a base station, and the transmission is on a physical uplink control channel.

6. The non-transitory computer-readable medium of clause 1, wherein:

the first wireless communications device comprises a base station and the second wireless communications device comprises a user equipment, and the transmission is on a physical downlink control channel.

7. The non-transitory computer-readable medium of clause 1, wherein:

the first wireless communications device comprises a first user equipment (UE) and the second wireless communications device comprises a second UE, and the transmission is on a physical sidelink control channel.

8. The non-transitory computer-readable medium of clause 1, further comprising:

code for causing the first wireless communications device to train the neural network in coordination with the second wireless communications device.

9. The non-transitory computer-readable medium of clause 8, further comprising:

code for causing the first wireless communications device to transmit at least one training weight resulting from the training to the second wireless communications device.

10. The non-transitory computer-readable medium of clause 9, further comprising:

code for causing the first wireless communications device to request an allocation of resources on which to transmit the at least one training weight.

11. The non-transitory computer-readable medium of clause 1, wherein the antenna configuration information comprises a panel orientation of an antenna array of the first wireless communications device, a dimension of the antenna array, and polarization information of the antenna array.

12. A non-transitory computer-readable medium having program code recorded thereon, the program code comprising:

code for causing a first wireless communications device to establish communication with a second wireless communications device;

code for causing the first wireless communications device to receive, from the second wireless communications device, antenna configuration information of an antenna configuration at the second wireless communications device and at least one neural network parameter of a neural network at the second wireless communications device for the communication; and code for causing the first wireless communications device to store the antenna configuration information and the at least one neural network parameter.

13. The non-transitory computer-readable medium of clause 12, further comprising:

code for causing the first wireless communications device to establish a second communication with a third wireless communications device.

14. The non-transitory computer-readable medium of clause 13, further comprising:

code for causing the first wireless communications device to determine that an antenna configuration of the third wireless communications device shares a characteristic with the antenna configuration information from the second wireless communications device; and code for causing the first wireless communications device to transmit, in response to the determination, the at least one neural network parameter to the third wireless communications device for use for the second communication.

15. The non-transitory computer-readable medium of clause 13, further comprising:

code for causing the first wireless communications device to coordinate with the second wireless communications device to train the neural network.

16. The non-transitory computer-readable medium of clause 15, further comprising:

code for causing the first wireless communications device to receive, in response to the coordination, at least one training weight for the neural network from the second wireless communications device.

17. The non-transitory computer-readable medium of clause 16, further comprising:

code for causing the first wireless communications device to determine that an antenna configuration of the third wireless communications device shares a characteristic with the antenna configuration at the second wireless communications device; and code for causing the first wireless communications device to transmit, in response to the determination, the at least one neural network parameter and the at least one training weight to the third wireless communications device for use for the second communication.

18. The non-transitory computer-readable medium of clause 16, further comprising:

code for causing the first wireless communications device to provide, to the second wireless communications device, an allocation of resources on which the at least one training weight is received.

19. The non-transitory computer-readable medium of clause 12, wherein the neural network comprises one from among a plurality of neural networks preconfigured at the first wireless communications device and the second wireless communications device.

20. The non-transitory computer-readable medium of clause 19, wherein the at least one neural network parameter comprises an identifier of the neural network selected from among the plurality of neural networks.

21. The non-transitory computer-readable medium of clause 12, wherein the at least one neural network parameter comprises one or more explicit parameters of the neural network.

22. The non-transitory computer-readable medium of clause 12, wherein:

the first wireless communications device comprises a user equipment and the second wireless communications device comprises a base station, and the reception is on a physical downlink control channel.

23. The non-transitory computer-readable medium of clause 12, wherein:

the first wireless communications device comprises a base station and the second wireless communications device comprises a user equipment, and the reception is on a physical uplink control channel.

24. The non-transitory computer-readable medium of clause 12, wherein:

the first wireless communications device comprises a first user equipment (UE) and the second wireless communications device comprises a second UE, and the reception is on a physical sidelink control channel.

25. The non-transitory computer-readable medium of clause 12, wherein the antenna configuration information comprises a panel orientation of an antenna array of the second wireless communications device, a dimension of the antenna array, and polarization information of the antenna array.

26. A first wireless communications device, comprising:

means for establishing communication with a second wireless communications device;

means for determining a neural network to use for the communication with the second wireless communications device based on an antenna configuration of the first wireless communications device; and means for transmitting antenna configuration information and at least one neural network parameter based on the neural network to the second wireless communications device.

27. The first wireless communications device of clause 26, wherein the neural network comprises one from among a plurality of neural networks preconfigured at the first wireless communications device.

28. The first wireless communications device of clause 27, wherein:

the means for determining further comprises means for selecting the neural network from the plurality of neural networks, and the at least one neural network parameter comprises an identifier of the selected neural network.

29. The first wireless communications device of clause 26, wherein the at least one neural network parameter comprises one or more explicit parameters of the neural network.

30. The first wireless communications device of clause 26, wherein:

the first wireless communications device comprises a user equipment and the second wireless communications device comprises a base station, and the transmission is on a physical uplink control channel.

31. The first wireless communications device of clause 26, wherein:

the first wireless communications device comprises a base station and the second wireless communications device comprises a user equipment, and the transmission is on a physical downlink control channel.

32. The first wireless communications device of clause 26, wherein:

the first wireless communications device comprises a first user equipment (UE) and the second wireless communications device comprises a second UE, and the transmission is on a physical sidelink control channel.

33. The first wireless communications device of clause 26, further comprising:

means for training the neural network in coordination with the second wireless communications device.

34. The first wireless communications device of clause 33, further comprising:

means for transmitting at least one training weight resulting from the training to the second wireless communications device.

35. The first wireless communications device of clause 34, further comprising:

means for requesting an allocation of resources on which to transmit the at least one training weight.

36. The first wireless communications device of clause 26, wherein the antenna configuration information comprises a panel orientation of an antenna array of the first wireless communications device, a dimension of the antenna array, and polarization information of the antenna array.

37. A first wireless communications device, comprising:

means for establishing communication with a second wireless communications device;

means for receiving, from the second wireless communications device, antenna configuration information of an antenna configuration at the second wireless communications device and at least one neural network parameter of a neural network at the second wireless communications device for the communication; and means for storing the antenna configuration information and the at least one neural network parameter.

38. The first wireless communications device of clause 37, further comprising:

means for establishing a second communication with a third wireless communications device.

39. The first wireless communications device of clause 38, further comprising:

means for determining that an antenna configuration of the third wireless communications device shares a characteristic with the antenna configuration information from the second wireless communications device; and means for transmitting, in response to the determining, the at least one neural network parameter to the third wireless communications device for use for the second communication.

40. The first wireless communications device of clause 38, further comprising:

means for coordinating with the second wireless communications device to train the neural network.

41. The first wireless communications device of clause 40, further comprising:

means for receiving, in response to the coordinating, at least one training weight for the neural network from the second wireless communications device.

42. The first wireless communications device of clause 41, further comprising:

means for determining that an antenna configuration of the third wireless communications device shares a characteristic with the antenna configuration at the second wireless communications device; and means for transmitting, in response to the determining, the at least one neural network parameter and the at least one training weight to the third wireless communications device for use for the second communication.

43. The first wireless communications device of clause 41, further comprising:

means for providing, to the second wireless communications device, an allocation of resources on which the at least one training weight is received.

44. The first wireless communications device of clause 37, wherein the neural network comprises one from among a plurality of neural networks preconfigured at the first wireless communications device and the second wireless communications device.

45. The first wireless communications device of clause 44, wherein the at least one neural network parameter comprises an identifier of the neural network selected from among the plurality of neural networks.

46. The first wireless communications device of clause 37, wherein the at least one neural network parameter comprises one or more explicit parameters of the neural network.

47. The first wireless communications device of clause 37, wherein:

the first wireless communications device comprises a user equipment and the second wireless communications device comprises a base station, and the reception is on a physical downlink control channel.

48. The first wireless communications device of clause 37, wherein:

the first wireless communications device comprises a base station and the second wireless communications device comprises a user equipment, and the reception is on a physical uplink control channel.

49. The first wireless communications device of clause 37, wherein:

the first wireless communications device comprises a first user equipment (UE) and the second wireless communications device comprises a second UE, and the reception is on a physical sidelink control channel.

50. The first wireless communications device of clause 37, wherein the antenna configuration information comprises a panel orientation of an antenna array of the second wireless communications device, a dimension of the antenna array, and polarization information of the antenna array.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:

establishing, by a first wireless communications device, communication with a second wireless communications device;

determining, by the first wireless communications device, a neural network to use for the communication with the second wireless communications device based on an antenna configuration of the first wireless communications device; and transmitting, by the first wireless communications device in response to determining the neural network, antenna configuration information and at least one neural network parameter based on the neural network to the second wireless communications device.

2. The method of claim 1, wherein:

the determining further comprises selecting the neural network from a plurality of neural networks, and the at least one neural network parameter comprises an identifier of the selected neural network.

3. The method of claim 1, wherein:

the first wireless communications device comprises a user equipment and the second wireless communications device comprises a base station, and the transmitting is on a physical uplink control channel.

4. The method of claim 1, wherein:

the first wireless communications device comprises a base station and the second wireless communications device comprises a user equipment, and the transmitting is on a physical downlink control channel.

5. The method of claim 1, wherein:

the first wireless communications device comprises a first user equipment (UE) and the second wireless communications device comprises a second UE, and the transmitting is on a physical sidelink control channel.

6. The method of claim 1, further comprising:

training, by the first wireless communications device, the neural network in coordination with the second wireless communications device; and transmitting, by the first wireless communications device, at least one training weight resulting from the training to the second wireless communications device.

7. The method of claim 1, wherein the antenna configuration information comprises a panel orientation of an antenna array of the first wireless communications device, a dimension of the antenna array, and polarization information of the antenna array.

8. A method of wireless communications, comprising:

establishing, by a first wireless communications device, communication with a second wireless communications device;

receiving, by the first wireless communications device from the second wireless communications device, antenna configuration information of an antenna configuration at the second wireless communications device and at least one neural network parameter of a neural network at the second wireless communications device for the communication in response to a determination of the neural network; and storing, by the first wireless communications device, the antenna configuration information and the at least one neural network parameter.

9. The method of claim 8, further comprising:

establishing, by the first wireless communications device, a second communication with a third wireless communications device.

10. The method of claim 9, further comprising:

determining, by the first wireless communications device, that an antenna configuration of the third wireless communications device shares a characteristic with the antenna configuration information from the second wireless communications device; and transmitting, by the first wireless communications device in response to the determining, the at least one neural network parameter to the third wireless communications device for use for the second communication.

11. The method of claim 9, further comprising:

coordinating, by the first wireless communications device, with the second wireless communications device to train the neural network; and receiving, by the first wireless communications device in response to the coordinating, at least one training weight for the neural network from the second wireless communications device.

12. The method of claim 11, further comprising:

determining, by the first wireless communications device, that an antenna configuration of the third wireless communications device shares a characteristic with the antenna configuration at the second wireless communications device; and transmitting, by the first wireless communications device in response to the determining, the at least one neural network parameter and the at least one training weight to the third wireless communications device for use for the second communication.

13. The method of claim 11, further comprising:

providing, by the first wireless communications device to the second wireless communications device, an allocation of resources on which the at least one training weight is received.

14. The method of claim 8, wherein the neural network comprises one from among a plurality of neural networks preconfigured at the first wireless communications device and the second wireless communications device.

15. The method of claim 8, wherein the antenna configuration information comprises a panel orientation of an antenna array of the second wireless communications device, a dimension of the antenna array, and polarization information of the antenna array.

16. A first wireless communications device, comprising:

a transceiver configured to establish communication with a second wireless communications device; and a processor configured to determine a neural network to use for the communication with the second wireless communications device based on an antenna configuration of the first wireless communications device, wherein the transceiver is further configured to transmit antenna configuration information and at least one neural network parameter based on the neural network to the second wireless communications device in response to the processor determining the neural network.

17. The first wireless communications device of claim 16, wherein:

the processor is further configured, for the determination, to select the neural network from a plurality of neural networks, and the at least one neural network parameter comprises an identifier of the selected neural network.

18. The first wireless communications device of claim 16, wherein:

the first wireless communications device comprises a user equipment and the second wireless communications device comprises a base station, and the transmission is on a physical uplink control channel.

19. The first wireless communications device of claim 16, wherein:

the first wireless communications device comprises a base station and the second wireless communications device comprises a user equipment, and the transmission is on a physical downlink control channel.

20. The first wireless communications device of claim 16, wherein:

the first wireless communications device comprises a first user equipment (UE) and the second wireless communications device comprises a second UE, and the transmission is on a physical sidelink control channel.

21. The first wireless communications device of claim 16, wherein:

the processor is further configured to train the neural network in coordination with the second wireless communications device, and the transceiver is further configured to transmit at least one training weight resulting from the training to the second wireless communications device.

22. The first wireless communications device of claim 16, wherein the processor comprises a neural network unit integrated with the transceiver.

23. The first wireless communications device of claim 16, wherein the processor comprises an application processor separate from the transceiver.

24. A first wireless communications device, comprising:

a transceiver configured to:

establish communication with a second wireless communications device; and receive, from the second wireless communications device, antenna configuration information of an antenna configuration at the second wireless communications device and at least one neural network parameter of a neural network at the second wireless communications device for the communication in response to a determination of the neural network; and a processor configured to store the antenna configuration information and the at least one neural network parameter at the first wireless communications device.

25. The first wireless communications device of claim 24, wherein the transceiver is further configured to:

establish a second communication with a third wireless communications device.

26. The first wireless communications device of claim 25, wherein:

the processor is further configured to determine that an antenna configuration of the third wireless communications device shares a characteristic with the antenna configuration information from the second wireless communications device; and the transceiver is further configured to transmit, in response to the determination, the at least one neural network parameter to the third wireless communications device for use for the second communication.

27. The first wireless communications device of claim 25, wherein:

the processor is further configured to coordinate with the second wireless communications device to train the neural network, and the transceiver is further configured to receive, in response to the coordination, at least one training weight for the neural network from the second wireless communications device.

28. The first wireless communications device of claim 27, wherein:

the processor is further configured to determine that an antenna configuration of the third wireless communications device shares a characteristic with the antenna configuration at the second wireless communications device; and the transceiver is further configured to transmit, in response to the determination, the at least one neural network parameter and the at least one training weight to the third wireless communications device for use for the second communication.

29. The first wireless communications device of claim 24, wherein the processor comprises a neural network unit integrated with the transceiver.

30. The first wireless communications device of claim 24, wherein the processor comprises an application processor separate from the transceiver.

* * * * *